(12) United States Patent
Rahman et al.

(10) Patent No.: US 8,191,074 B2
(45) Date of Patent: *May 29, 2012

(54) METHOD AND APPARATUS FOR AUTOMATIC DEBUGGING TECHNIQUE

(75) Inventors: Shahriar Rahman, San Jose, CA (US); Diamantis Kourkouzelis, San Francisco, CA (US)

(73) Assignee: Ericsson AB, Stockholm (SE)

( * ) Notice: Subject to any disclaimer, the term of this patent is extended or adjusted under 35 U.S.C. 154(b) by 1068 days.

This patent is subject to a terminal disclaimer.

(21) Appl. No.: 11/985,602

(22) Filed: Nov. 15, 2007

(65) Prior Publication Data

US 2009/0133041 A1 May 21, 2009

(51) Int. Cl.
*G06F 3/00* (2006.01)
(52) U.S. Cl. .......................... 719/310; 714/699
(58) Field of Classification Search .................. 719/310; 714/699
See application file for complete search history.

(56) References Cited

U.S. PATENT DOCUMENTS

| | | | |
|---|---|---|---|
| 5,526,485 A | 6/1996 | Brodsky | |
| 5,533,192 A * | 7/1996 | Hawley et al. | 714/28 |
| 5,745,770 A * | 4/1998 | Thangadurai et al. | 710/260 |
| 5,933,639 A * | 8/1999 | Meier et al. | 717/129 |
| 6,263,456 B1 * | 7/2001 | Boxall et al. | 714/31 |
| 6,418,543 B1 * | 7/2002 | Goli et al. | 714/38 |
| 6,442,751 B1 | 8/2002 | Cocchi et al. | |
| 6,988,485 B2 | 1/2006 | Sarma et al. | |
| 7,353,498 B2 | 4/2008 | Gupta et al. | |
| 2001/0034859 A1 * | 10/2001 | Swoboda et al. | 714/39 |
| 2003/0056198 A1 | 3/2003 | Al-Azzawe et al. | |
| 2004/0073658 A1 | 4/2004 | Oran et al. | |
| 2004/0210876 A1 | 10/2004 | Stall et al. | |
| 2007/0130345 A1 | 6/2007 | Da Palma et al. | |
| 2009/0031171 A1 | 1/2009 | Fashchik et al. | |

OTHER PUBLICATIONS

Miron Abramovici, A Reconfigurable Design-for-Debug Infrastructure for SoCs, 2006.*
Office Action for U.S. Appl. No. 11/985,600, mailed Oct. 30, 2009, 17 pages.
Rachel Tzoref et al., "Instrumenting Where It Hurts—An Automatic Concurrent Debugging Technique", ISSTA '07, Jul. 9-12, 2007, London, England, United Kingdom, .cs.purdue.edu/homes/xyzhang/fall07/Papers/it_hurts.pdf—Shmuel Ur, Jul. 9-12, 2007, pp. 27-37.
Cisco IOS Debug Command Reference, p. DB-9 to DB-13, 2003.
Exerpts from the Packet Filter Troubleshooting and Solutions Guide, support.novell.com/techcenter/articles/anz20010701.html, Jul. 1, 2001.

(Continued)

*Primary Examiner* — Lechi Truong
(74) *Attorney, Agent, or Firm* — Blakely Sokoloff Taylor & Zafman, LLP (57) ABSTRACT

A first code module in a computing device detects an event that constitutes an automatic start debug session condition. The detected event is an occurrence of significance to the first code module and the condition is a set of one or more start criterions of which the detected event is a part. One or more actions for that condition are determined, wherein each action includes properties of a different debug session. At least one of the action(s) are sent to a second code module in the computing device upon determining that the second code module should automatically start at least one debug session. One or more debug flags are set according to each action to start the debug session corresponding to each action and a set of debug messages corresponding to the flags that are set are generated.

20 Claims, 6 Drawing Sheets

OTHER PUBLICATIONS

Final Office Action, U.S. Appl. No. 11/985,600, dated May 13, 2011, 20 pages.

Non-Final Office Action, U.S. Appl. No. 11/985,600, dated May 24, 2010, 27 pages.

Non-Final Office Action, U.S. Appl. No. 11/985,600, dated Dec. 9, 2010, 18 pages.

* cited by examiner

FIG. 1

AUTO. START DEBUG SESSION CONDITION STRUCTURE 125

| AUTO. START DEBUG SESSION CONDITION NAME 202 | AUTO. START DEBUG SESSION CONDITION TYPE 204 | AUTO. START DEBUG SESSION CONDITION THRESHOLD 206 | AUTO. START DEBUG SESSION CONDITION ID 208 |
|---|---|---|---|
| Authentication Failures | Failure | 3 | 1 |
| Consecutive Route Add Failures | Failure | 5 | 2 |
| ... | ... | ... | ... |
| ... | ... | ... | N |

FIG. 2A

ACTION STRUCTURE 128

| ACTN. ID 207 | AUTO START DEBUG SESS. COND. ID 208 | SRC. 210 | DEST. 212 | EVENT 214 | DURATION 216 | INTERRUPT 218 | COUNTER 220 | SEVERITY 222 | LOG 224 | PRIORITY 226 | FILTER 228 | VERBOSITY 230 | FLAG(S) 232 |
|---|---|---|---|---|---|---|---|---|---|---|---|---|---|
| 1 | 1 | System Module A | System Module A | 3 Consec. Auth- Successes | 300 Seconds | Allowed | 3 | Alert | Enabled | High | 1.2.3.4 | Normal | 15 |
| 2 | 1 | System Module A | System Module B | 4 Consec. Reg- Successes | 90 Seconds | Allowed | 5 | Alert | Disabled | Low | NULL | Brief | 10, 37 |
| 3 | 2 | System Module B | System Module A | NULL | 120 Seconds | Disallowed | NULL | Critical | Disabled | Medium | MAC1 | Detail | 2 |
| ⋮ | ⋮ | ⋮ | ⋮ | ⋮ | ⋮ | ⋮ | ⋮ | ⋮ | ⋮ | ⋮ | ⋮ | ⋮ | ⋮ |

COUNTER 220

| NUMBER |
|--------|
| NULL |

VERBOSITY 230

| BRIEF |
|-------|
| NORMAL |
| DETAIL |
| VERBOSE |

FILTER 228

| NULL |
|------|
| IP ADDRESS |
| MAC ADDRESS |
| CIRCUIT IDENTIFIER |
| SUBSCRIBER SESSION IDENTIFIER |
| NETWORK ACCESS IDENTIFIER |

FIG. 3B

METHOD AND APPARATUS FOR AUTOMATIC DEBUGGING TECHNIQUE

CROSS-REFERENCE TO RELATED APPLICATIONS

Not Applicable.

BACKGROUND

1. Field

The present invention relates generally to computing device debugging. More particularly, this invention relates to providing automatic debugging within a computing device.

2. Background

Debugging techniques exist to generate debug messages to monitor, administer, and troubleshoot computing devices. As an example, debug messages provides system administrators information regarding a problem in the computing device. The information in the debug message may allow the system administrator to identify and resolve the problem (e.g., troubleshooting). Debug messages are generated in a time period known as a debug session. Debug sessions in the prior art must be manually started and stopped. Debug messages are generated continuously during the debug session until the debug session has been stopped.

Typical debugging techniques require a system administrator to determine whether to generate debug messages (e.g., whether to start a debug session) and what module should generate debug messages. The system administrator likely does not want every module to generate debug messages as the amount of debug messages that could be generated by every module may be too large to effectively process (e.g., the system administrator can be overwhelmed with debug messages). Additionally, generating debug messages impacts system performance (e.g., processing load, memory consumption, storage capacity, etc.). Therefore the system administrator desires only to generate debug messages relative to the task at hand. For example in the common case of troubleshooting a problem, the system administrator desires only to generate debug messages relative to the problem.

Choosing which debug messages to generate (e.g., which module should generate debug messages) is not a trivial task for the system administrator. In the case of troubleshooting a problem, typically the system administrator makes a prediction of what the problem is and where (e.g., module, interface, etc.) the problem is occurring. After this prediction, the system administrator configures debug messages to be generated in the computing device where the problem is likely occurring. If this prediction is wrong (e.g., the debug messages do not provide information relevant to the problem) the system administrator configures debug messages to be generated somewhere else in the computing device. By this repeated process of prediction and selective generation of debug messages the system administrator hopes to identify and resolve the problem. In addition to the time and effort it may take the system administrator to complete this process, in the case of a rare problem (e.g, a problem not usually encountered) the system administrator may not be able to locate and resolve the problem regardless of time spent debugging.

In the prior art, debug sessions must be manually started and stopped. One way of manually starting a debug session and limiting the debug messages generated during the debug session is by using filtering debugging techniques. A system administrator manually turns on preconfigured filters in the computing device (thus manually starting a debug session) and debug messages are generated consistent with the filter.

As a simple example of a filter, the system administrator may limit the debug messages generated based on a certain Media Access Control (MAC) address. Thus debug messages are generated during a debug session only for that certain MAC address. Another example of a filter is limiting debug messages to a certain interface of the computing device. However, although filtering debugging techniques limit the debug messages generated, filtering debugging techniques have the disadvantage that a system administrator must manually start the debug session (by manually turning on the filter) and manually stop the debug session. Thus, once the administrator has manually started the debug session, debugging messages are generated continuously consistent with the filter consuming valuable system resources (e.g., processing cycles, available memory, storage capacity, etc.) until the system administrator manually stops the debug session (e.g., by turning off the filter).

Additionally, another way of manually starting a debug session and limiting the debug messages generated during the debug session is by using reporting conditionally debugging techniques. A system administrator manually turns on preconfigured reporting conditions in the computing device (thus manually starting a debug session) and debug messages are generated consistent with the reporting condition. A reporting condition may be an event or events that occur within the computing device. For example, a reporting condition may be an authentication failure. Thus, after a system administrator manually starts a debug session (by manually turning on the reporting condition 'authentication failure') the computing device generates debug messages for every authentication failure in the computing device. However, reporting conditionally debugging techniques have the disadvantage that a system administrator must manually start the debug session (by manually turning on the reporting condition) and manually stop the debug session. Thus, once the administrator has manually started the debug session, debugging messages are generated continuously consistent with the reporting condition consuming valuable system resources (e.g., processing cycles, available memory, storage capacity, etc.) until the system administrator manually stops the debug session (e.g., by turning off the reporting condition). Additionally, reporting conditionally debugging techniques have the disadvantage that once the reporting condition is met the debug messages cannot be prevented from being generated. Filtering debugging and reporting conditionally debugging techniques may be used together. Using the above examples to illustrate, debug messages are generated upon an authentication failure for a particular MAC address.

Debug messages may be logged either internally and/or externally. Logging debug messages allows a system administrator to examine the debug messages at a later time. Debug messages may be externally logged by any known means of propagating these messages to an external computing device. For example, RFC3164, "The BSD syslog Protocol" (August 2001), may be used to externally log debug messages to an external computing device.

Once the debug messages have been logged, the system administrator may use those debug messages in an effort to locate and resolve the problem. Often the system administrator will use the debug messages in order to recreate the problem on a different computing device. However, recreating any problem is a time consuming process and often rare problems cannot be recreated effectively. For example, in the case of a rare problem encountered on the computing device, the owner of the computing device recognizes that a problem has occurred (although the owner likely does not know the cause of or any resolution of the problem) and notifies the system administrator that something is wrong. As the problem was unexpected and rare, a debug session relevant to the problem likely was not manually started (thus debug messages relevant to the problem probably were not generated). As a system administrator may not be able to resolve the problem without additional information (e.g., debug messages), the system administrator often instructs the owner of the computing device on what to do if the problem occurs again (e.g., the information to gather if the problem occurs again). If the owner of the computing device recognizes the problem again, and is able to gather the information, the system administrator may be able to recreate the problem and resolve that problem with the use of the gathered information. However, the information gathered may not be sufficient to resolve the problem and the system administrator may have to further instruct the owner of the computing device to gather different information. This process is repeated until the system administrator can resolve the problem. As should be understood, the rarer the problem is the more likely that the process will be repeated and a significant amount of time will be spent undertaking this process.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

The techniques shown in the figures can be implemented using code and data stored and executed on one or more electronic devices (e.g., a computer, a network element, etc.). Such electronic devices store and communicate (internally and with other computers over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such computers typically include a set of one or more processors coupled to one or more other components, such as a storage device, a number of user input/output devices (e.g., a keyboard and a display), and a network connection. The coupling of the set of processors and other components is typically through one or more busses and bus controllers. The storage device and network connection respectively represent one or more machine storage media and machine communication media. Thus, the storage device of a given electronic device typically stores code and data for execution on the set of one or more processors of that electronic device. Of course, one or more parts of an embodiment of the invention may be implemented using different combinations of software, firmware, and/or hardware.

A method and apparatus for automatic computing device debugging is described. In one embodiment of the invention a first code module detects an event and determines whether the detected event constitutes a condition, and further determines one or more actions for that condition, where each action defines properties of a debug session. The first code module triggers a second code module to automatically start a debug session according to the action. In another embodiment of the invention, system checks and code module checks are performed to determine whether the computing device and the code module respectively support the additional overhead caused by generating debug messages during the debug session. In another embodiment, the debug session is automatically stopped according to one or more stop criterions included in the action.

Figure 1:
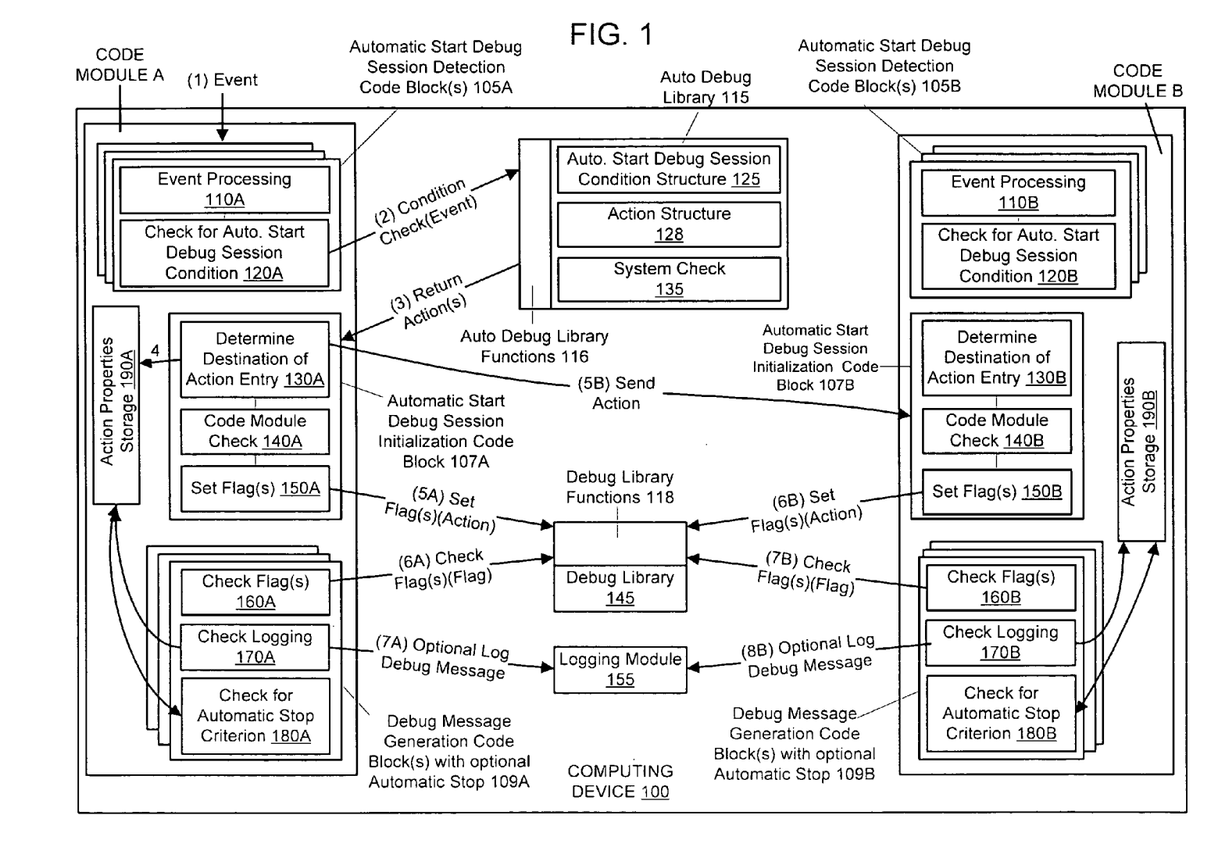
FIG. 1 is a data flow diagram illustrating an exemplary computer device configured for automatically debugging according to one embodiment of the invention.

FIG. 1 is a data flow diagram illustrating an exemplary device configured for automatically debugging according to one embodiment of the invention. The operations of the data flow diagram FIG. 1 will be described with reference to the exemplary embodiment of FIGS. 2A, 2B, 3A, 3B and 4. However, it should be understood that the operations of the data flow diagram FIG. 1 can be performed by embodiments of the invention other than those discussed with reference to FIGS. 2A, 2B, 3A, 3B, and 4, and the embodiments discussed with reference to FIGS. 2A, 2B, 3A, 3B, and 4 can perform operations different than those discussed with reference to the data flow diagram.

Referring to FIG. 1, computing device 100 includes code module A and code module B. Computing device 100 may be any computing device in which debug messages are generated (e.g., workstation, network element, etc.). Code modules A and B may be any module, thread, or process in the computing device in which debug messages may be generated. As an example of a code module, in the case of a computing device being a router, a module in the router that may generate debug messages is the routing module (e.g., Routing Information Base module). Included in code module A and code module B are automatic start debug session detection code block(s) 105A and 105B respectively, automatic start debug session initialization code block 107A and 107B respectively, debug message generation code block(s) with optional automatic stop 109A and 109B respectively, and action attributes storage 190A and 190B respectively. Within the automatic start debug session detection code block(s) 105A and 105B are event processing 110A, event processing 110B, check for automatic start debug session condition 120A, and check for automatic start debug session condition 120B respectively (blocks labeled with "A" correspond with code module A and blocks labeled with "B" correspond with code module B). Within the automatic start debug session initialization code block 107A and 107B are determine destination of action entry 130A, determine destination of action entry 130B, code module check 140A, code module check 140B, set flag(s) 150A, and set flag(s) 150B respectively. Automatic start debug session detection code block(s) 105A and 105B and debug message generation code block(s) with optional automatic stop 109A and 109B are interspersed at various locations within code module A and code module B. In one embodiment of the invention, the code within code module A already includes event processing 110A and check for automatic start debug session condition 120A is added to the code to create an automatic start debug session detection code block 105A. Details regarding each of these will be discussed with greater detail below. Also included in computing device 100 are auto debug library 115, debug library 145 and logging module 155.

Figure 4:
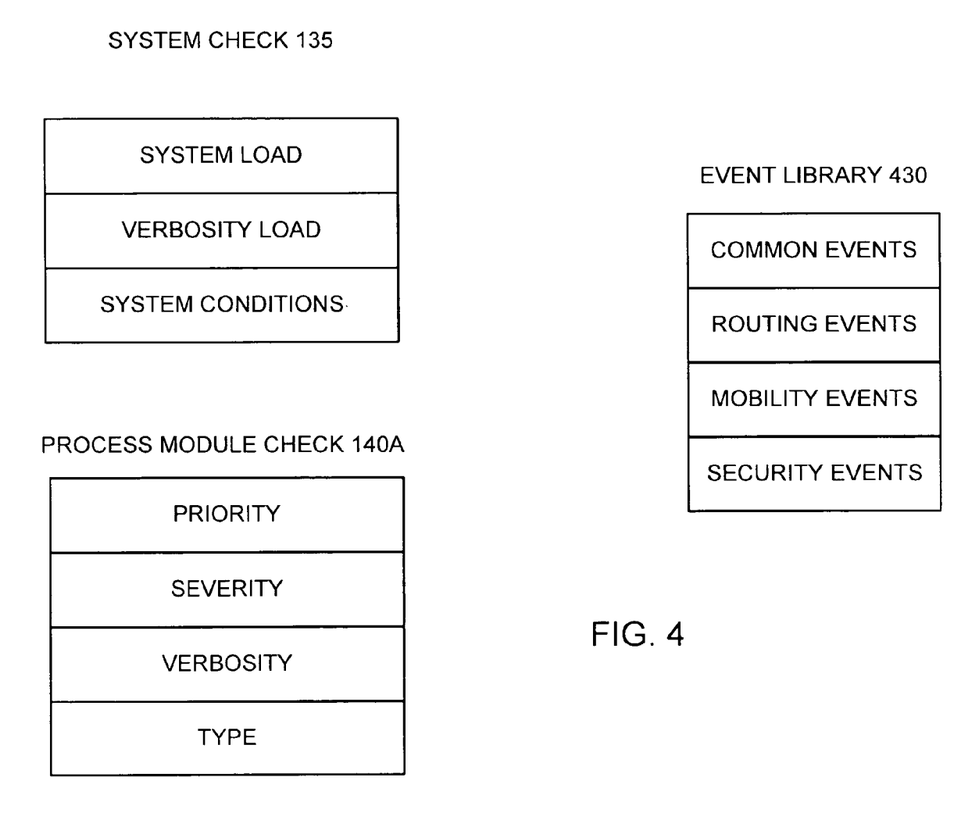
FIG. 4 illustrates exemplary control checks and an exemplary event library according to one embodiment of the invention.

At a time 1, event processing 110A, included within automatic start debug session detection code block(s) 105A, processes a detected event. The detected event is an occurrence of significance to the first code module. For example, a detected event may be any variation from normal and expected computing device behavior. For example an event may be an authentication failure. However, an event may also be certain routine behavior. For example, an event may occur when a user logs on to the computing device. According to one embodiment of the invention, events are defined in an event library (not shown in FIG. 1 for simplicity purposes). An exemplary event library is illustrated in FIG. 4 as event library 430. Included within event library 430 are common events, routing events, mobility events and security events. Common events may include events that are common to every code module in the computing device. Routing events, mobility events, and security events may be specific to certain code modules in the computing device. It should be understood that the type of events illustrated in event library 430 is illustrative and is not meant to be limiting. For example, in one embodiment of the invention event library 430 is extendable by user action. According to one embodiment of the invention, each code module registers with event library 430 the events that it supports.

As previously described, the detected event is processed at event processing 110A at a time 1. According to one embodiment of the invention event processing 110A determines whether the event is pertinent to code module A (e.g., whether code module A supports that event). If the event is pertinent to code module A, code module A increases a counter for the event and passes this information to check for automatic start debug session condition 120A. Thus, code module A accounts for the number of times that that event being processed has been encountered according to one embodiment of the invention. For example, upon code module A processing an authentication failure, code module A increases the counter for the event authentication failure by one.

The event counter is passed to check for automatic start debug session condition 120A. Check for automatic start debug session condition 120A determines if the detected event constitutes an automatic start debug session condition. An automatic start debug session condition is a set of one or more start criterions of which the detected event is a part. For example, an automatic start debug session condition may include one or more events. For example, the automatic start debug session condition authentication failure may include one or more authentication failure events. Thus check for automatic start debug session condition 120A determines if a processed event constitutes an automatic start debug session condition.

Figure 2A:
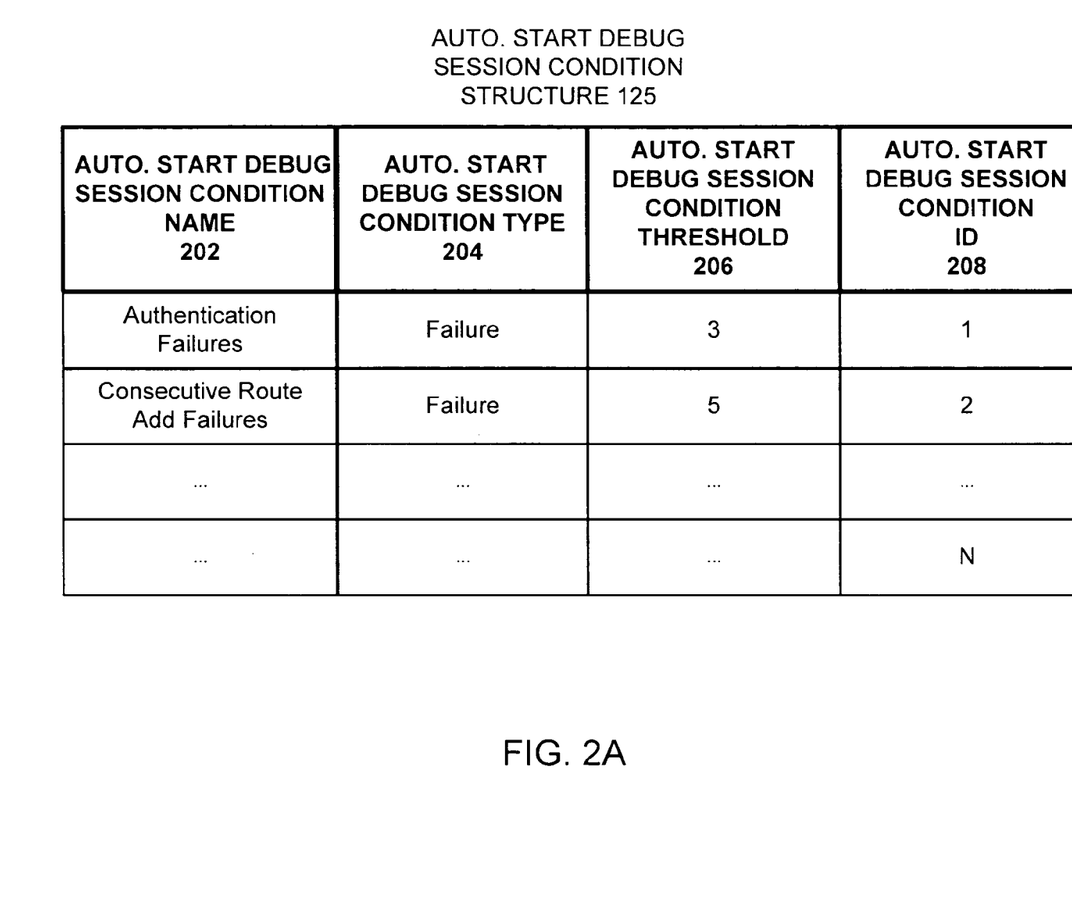
FIG. 2A illustrates an exemplary automatic start debug session condition structure according to one embodiment of the invention.

According to one embodiment of the invention, check for automatic start debug session condition 120A passes the event and the count of the event to auto debug library 115 at a time 2. Auto debug library 115 contains one or more auto debug library functions 116 which access information stored in auto debug library 115. For example, check for automatic start debug session condition 120A may call an auto debug library function to determine if an automatic start debug session condition exists for the count of events (e.g., condition_check(event)). This auto debug library function call checks automatic start debug session condition structure 125 to determine if an automatic start debug session condition has been met. FIG. 2A illustrates an exemplary automatic start debug session condition structure according to one embodiment of the invention. While in one embodiment the automatic start debug session condition structure 125 is a table, in alternative embodiments the automatic start debug session condition structure 125 is a different data structure (e.g., a linked list, tree, etc.). Automatic start debug session condition structure 125, as illustrated in FIG. 2A, includes automatic start debug session condition name 202, automatic start debug session condition type 204, automatic start debug session condition threshold 206 and automatic start debug session condition ID 208. The field automatic start debug session condition name 202 is defined with one or more events. Thus in FIG. 2A, authentication failures is an automatic start debug session condition with the automatic start debug session condition ID of 1. Similarly, consecutive route add failures is an automatic start debug session condition with the automatic start debug session condition ID of 2. The field automatic start debug session condition type 204 indicates the kind of automatic start debug session condition a particular automatic start debug session condition entry is. For example, in FIG. 2A, "failure" is the type of automatic start debug session condition for automatic start debug session condition ID 1 and 2. Other automatic start debug session condition types may be, which can be of the types "failure", "timeout", "delay", "lack of resource", "overwhelm", "administrative", etc. The field automatic start debug session condition threshold 206 denotes how many times a particular event must have been detected prior to meeting an automatic start debug session condition. Therefore, if code module A has encountered 3 authentication failures or 5 consecutive route add failures then an automatic start debug session condition has been met. If an automatic start debug session condition has been met, internally within auto debug library 115 a determination is made to determine an action or actions that correspond to that automatic start debug session condition. An action defines the properties of an automatic debug session including, among other things, an indication of which debug messages should be generated, whether those debug messages should be logged, and when the debug session should be stopped (i.e., when the debug messages should stop being generated). Actions are defined within action structure 128 according to one embodiment of the invention. According to another embodiment of the invention, the automatic start debug session condition structure 125 and the action structure 128 are combined into a single combined automatic start debug session condition/action structure.

Figure 2B:
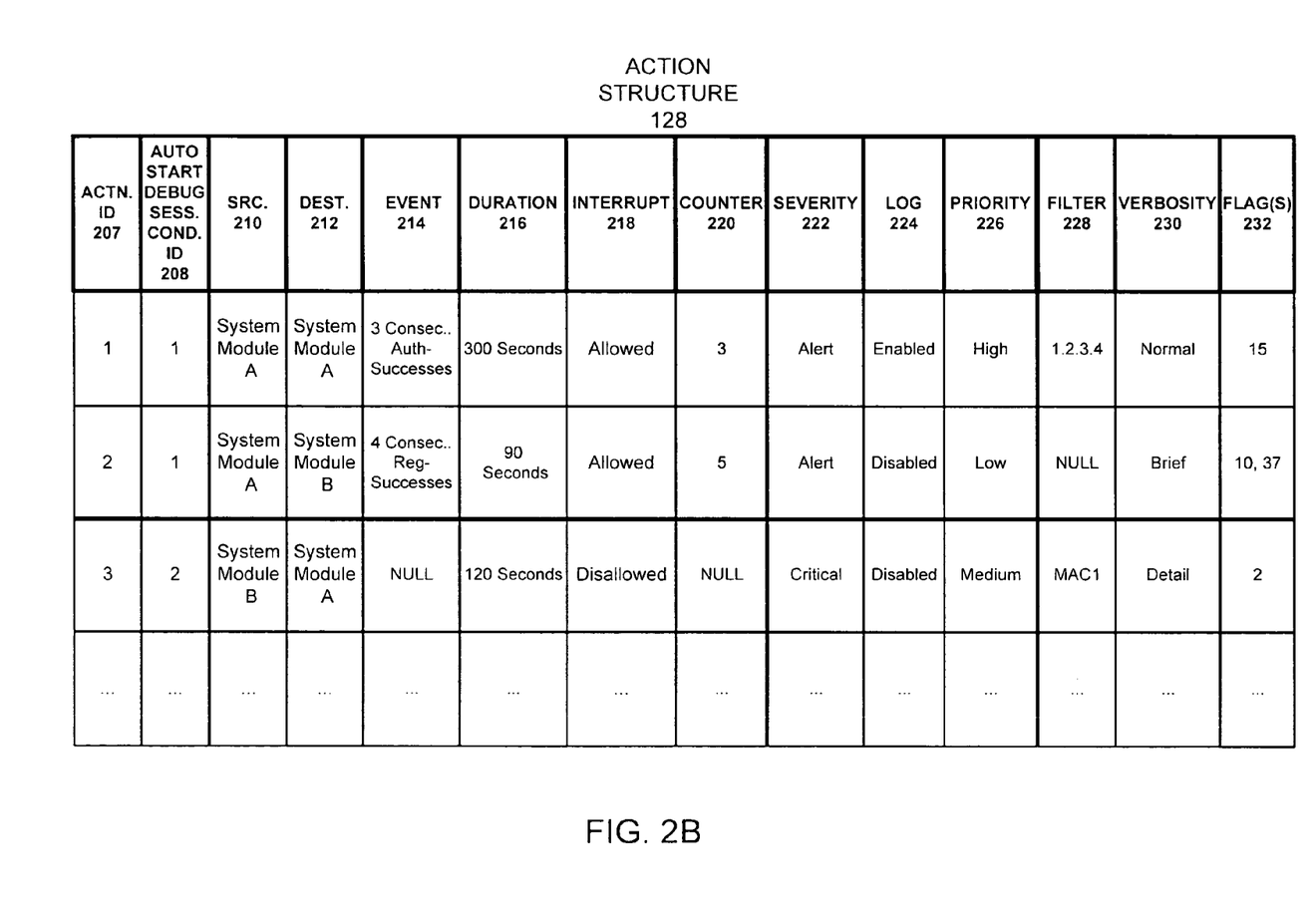
FIG. 2B illustrates an exemplary action structure according to one embodiment of the invention.

FIG. 2B illustrates an exemplary action structure according to one embodiment of the invention. While in one embodiment the action structure 128 is a table, in alternative embodiments the action structure 128 is a different data structure (e.g., a linked list, tree, etc.). An entry in the action structure (e.g., a row in action structure 128 as illustrated in FIG. 2B) defines attributes of a single action. Thus, each entry in the action structure defines the properties of a single debug session. Note that a single automatic start debug session condition may correspond with multiple actions. For example, in the action structure 128 illustrated in FIG. 2B, automatic start debug session condition ID 1 corresponds with two actions (action ID 1 and action ID 2). Each action entry in action structure 128 includes a source attribute 210 and a destination attribute 212 according to one embodiment of the invention. The source attribute 210 indicates from which code module the action originates. Note that if there is not an entry in action structure 128 that corresponds to the automatic start debug session condition ID of the automatic start debug session condition for that code module, then no action is returned to that source and a debug session will not be started. As will be described in greater detail below, although action(s) may exist for a certain automatic start debug session condition, a debug session is not always automatically started as a result.

According to another embodiment of the invention, check for automatic start debug session condition 120A determines whether the detected event constitutes a automatic start debug session condition by looking up an automatic start debug session condition structure that is local to code module A. For example, an automatic start debug session condition structure may exist in code module A that is private to code module A. Thus each automatic start debug session condition that is relevant to code module A is contained within the local automatic start debug session condition structure. Similarly, one or more actions corresponding to each automatic start debug session condition may also be defined locally to code module A.

Generating debug messages is considered overhead in computing device 100 and can negatively affect the performance of computing device 100 (e.g., generating debug messages consumes system resources such as processor usage, memory usage, disk usage, etc.). Thus, according to one embodiment of the invention before action(s) are returned to code module A, a system check 135 is performed. The system check 135 determines whether the computing device 100 allows a debug session to start. Many different system checks may be performed during the system check 135. For example, one system check that may be performed is a system load check. If the system load is over a certain percentage, the computing device will not allow debug messages to be generated. Thus, the system load check is acting as a threshold. Similarly, other system checks may be performed during system check 135 (e.g., free memory of the computing device, the number of blocked processes, the rate of context switches, etc.).

Figure 3A:
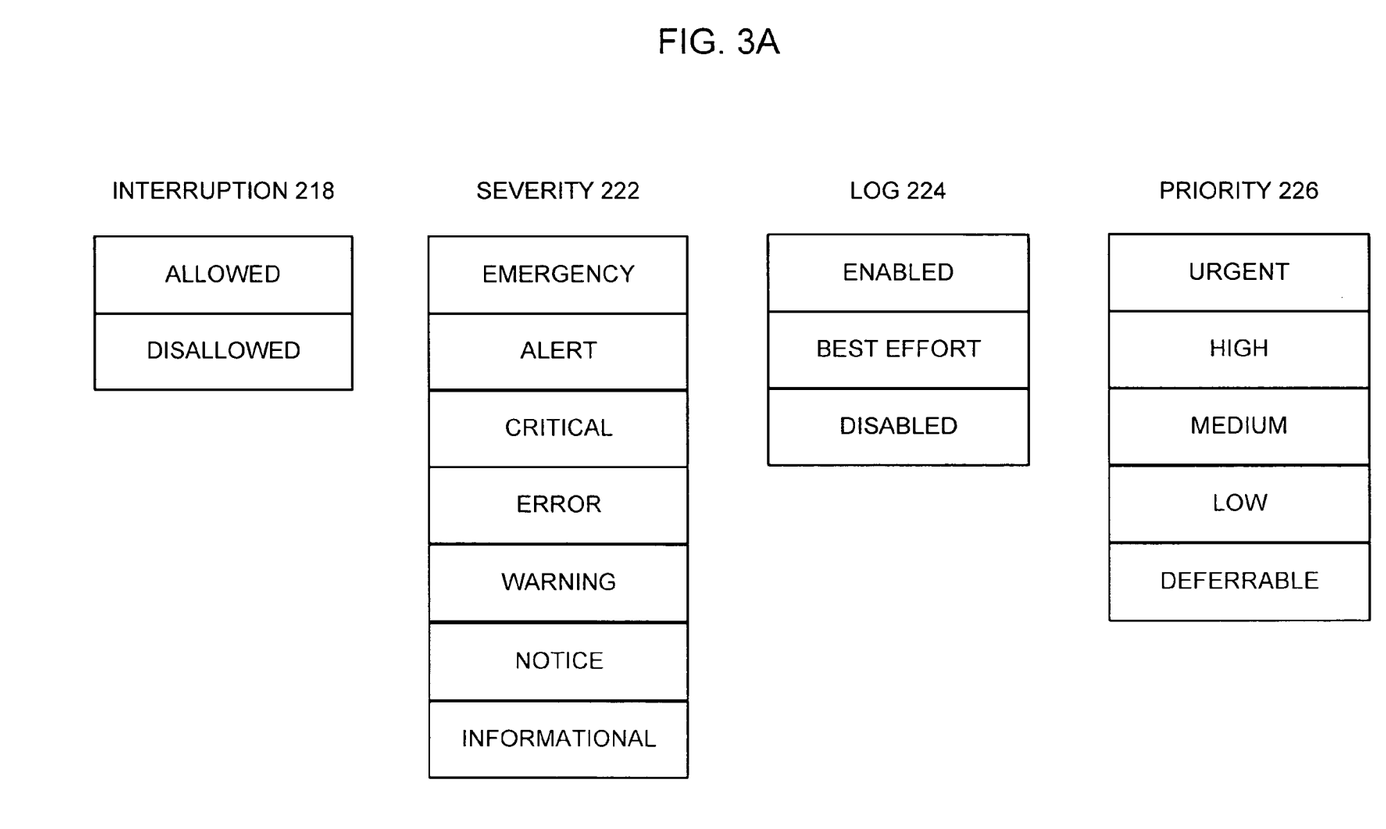
FIGS. 3A and 3B illustrate exemplary fields of an exemplary action structure according to one embodiment of the invention.

In one embodiment of the invention the system checks are performed in conjunction with certain attributes of the action. For example, the severity attribute 222 of action structure 128 as illustrated in FIG. 3A indicates the relative importance of the action. The more important the action the less value system checks are given. For example, the severity attribute 222 may be marked as emergency, which indicates that the computing device may be unusable. If the severity attribute 222 is marked as emergency, in one embodiment of the invention regardless of the results of any system checks performed the debug session may be allowed to start (e.g., no matter how high the current processing load of the computing device is, the computing device allows the debug session to start). As another example, the severity attribute may be marked as alert, which indicates that attention is needed immediately. Thus, similarly to being marked as emergency, in one embodiment of the invention the computing device 100 allows the debug session to start regardless of the results any system checks performed. The severity attribute 222 may be marked differently (e.g., critical, error, warning, notice, informational, etc.).

According to one embodiment of the invention the level of the system checks are dynamic depending on the severity attribute 222. For example, the severity attribute may be marked as critical, which indicates that the automatic start debug session condition is critical. If the severity attribute 222 is marked as critical, each system check performed is modified so that debug sessions are allowed to start except in cases of extreme system state. For example, if the automatic start debug session condition is critical, computing device 100 may allow a debug session to start unless the system load running is critically high (e.g., over 90% of its capacity). Similarly, if the severity attribute 222 is marked with error (error attributes indicate that the automatic start debug session condition is related to an error), computing device 100 may allow a debug session to start unless the system load is over 75% of total capacity. Similarly, actions marked as warning, notice, or informational have similar dynamic system checks associated with them. It should be understood that the above examples are illustrative as the above system checks may be performed differently and many other system checks may be performed.

Assuming that the system checks have been passed (i.e., the computing device allows a debug session to start) or the actions have bypassed the system checks (e.g., the severity of the action is emergency or alert), at a time 3 the action(s) are returned to code module A. The action(s) that are returned include all the information in the corresponding action entry according to one embodiment of the invention. For example, referring to FIG. 2B, the action entries associated with action ID 1 and action ID 2 are returned to code module A at a time 3. The action(s) that are received by code module A are placed into the action attributes storage 190A temporarily. Thus, referring to FIG. 2B, the attributes associated with action ID 1 and action ID 2 are stored in the action attributes storage 190A temporarily. Action attribute storage may be storage by any means known in the art (e.g., cache, RAM, hard disk, optical disk, etc.). While in one embodiment of the invention the action is stored locally relative to a code module, in alternative embodiments of the invention the actions are stored globally relative to the computing device. According to one embodiment of the invention, after the action(s) are dispatched to the appropriate code modules according to the destination attribute 212, code module A resets the event counter for that corresponding event. According to another embodiment of the invention, after the action(s) are returned to code module A, code module A resets the event counter for that corresponding event.

Once the action(s) are returned, determine destination of action entry 130A determines the destination of the action(s) at a time 4. The destination indicates which code module in computing device 100 is to receive the action and start the debugging session for that action. For example referring to FIG. 2B, if code module A receives the actions associated with action ID 1 and action ID 2, the determine destination of entry 130A determines that the destination attribute 212 of action ID 1 is code module A and the destination attribute 212 of action ID 2 is code module B. Thus, code module A is a destination of one of the actions and code module B is the destination of the other action. While in one embodiment of the invention the determine destination of action entry 130A accesses action attributes storage 190A to determine the destination, in alternative embodiments of the invention the determine destination of action entry 130A accesses action structure 128 directly to determine the destination of the action.

After the destination of each of the action entries are determined, the actions are sent to their destinations. Thus, at a time 5B the action corresponding to action ID 2 is sent from code module A to code module B. Thus, code module A triggers an action to code module B along with properties of a debug session. Actions may be sent from one code module to a different code module by any known means of communicating between code modules (e.g., inter-process communication (IPC)). In one embodiment the auto debug library 115 maintains a list of the code modules that are capable of sending and receiving actions and the IPC endpoints of those code modules. When a code module determines to send an action(s) to a different code module the sending code module determines the IPC endpoint of the receiving code module and sends the message over an IPC channel (e.g., message queue, mailbox, pipe, socket, etc.). Thus, code module A determines the IPC endpoint of code module B and sends the action to code module B triggering the start of a debug session. Additionally, in one embodiment of the invention, although the source and destination of the action corresponding to action ID 1 is the same code module (code module A), the action is processed by code module A as if it were received from a different code module. In other words, code module A self-triggers the start of an automatic debug session.

As previously mentioned, generating debug messages is considered overhead as generating debug messages is not the primary function of the computing device. In addition to affecting the performance of computing device 100 as a whole, generating debug messages may also affect the performance of particular code modules. Thus it is possible that the computing device as a whole supports the start of a debug session (e.g., the system checks have passed) but the code module does not have the necessary resources to support the debug session. For example, if the code module A is a RIB module (e.g., a module that manages routing information in a router) generating debug messages may affect the rate at which the RIB module can add or update routes in a routing table. According to one embodiment of the invention, before the debug session is started each code module that has received an action performs a code module check. Referring to FIG. 1, code module A performs the code module check 140A and code module B performs the code module check 140B. The code module A and the code module B may disregard the action depending on the code module check 140A and the code module check 140B respectively, or the code module A and the code module B may disregard and/or modify certain attributes in the actions depending on the code module check 140A or the code module check 140B respectively.

In one embodiment of the invention, the code module check 140A is performed by matching particular attributes of the received action against a local code module profile. For example, code module A and code module B each have a profile that can be used to perform the code module check 140A. While in one embodiment of the invention the code module profile is configured statically (i.e., the code module profile does not change), in alternative embodiments of the invention the code module profile is dynamically configured based on the system state (e.g., processing load, memory load, disk load, etc.). As an example, a local code module profile includes information corresponding to particular attributes of the received action.

According to one embodiment of the invention, the local code module profile includes information corresponding to the severity attribute 222, the priority attribute 226, and the verbosity attribute 230. As an example, the local code module profile is configured to disregard an action (thus preventing the debug messages to be generated) unless the severity attribute in the action is marked as emergency 306, alert 308, or critical 310.

Figure 3B:
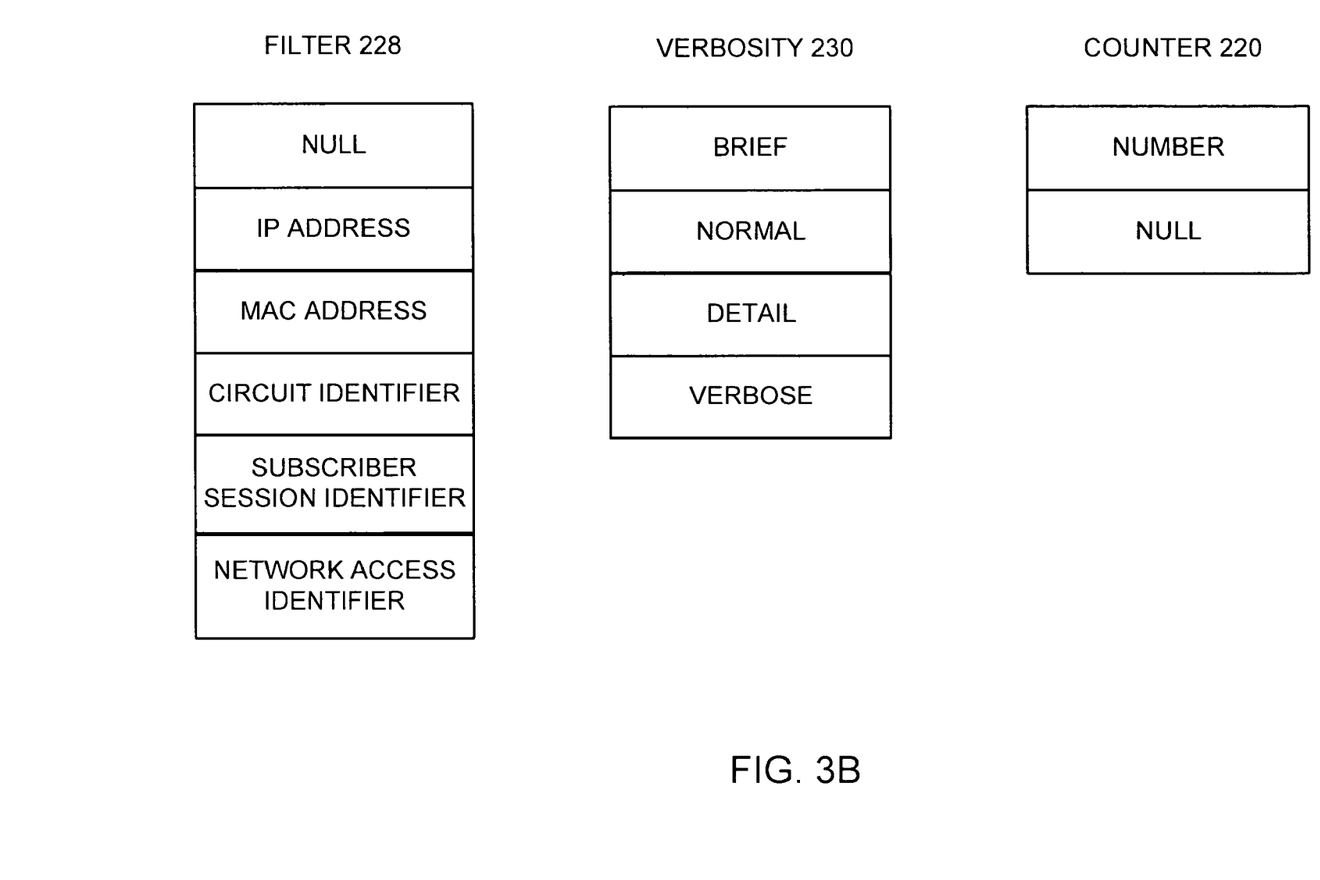

According to one embodiment of the invention, the profile may modify or ignore the verbosity attribute included in the action. The verbosity attribute 230 defines the verbosity level of the debug message (i.e., the level of detail included in the debug message). For example, the verbosity attribute 230 may be defined as brief (debug message should be as concise as possible), normal (debug message should be moderately detailed), detail (debug message should be detailed), and verbose (everything about the debug message should be generated). The profile may be configured to ignore the verbosity level defined in the action if the verbosity level of the action is greater than the verbosity level defined in the profile. For example, the profile may be configured to ignore the verbosity level defined in the action if the verbosity attribute is marked as detail or verbose. According to one embodiment of the invention, when the verbosity level included in the action is ignored the verbosity attribute defined in the profile is used and processing of the action is continued. Additionally the profile may be configured to honor the verbosity level in the action regardless of the verbosity attribute defined in the profile depending on the severity attribute 222. For example, if the severity attribute 222 is marked as emergency, alert, or critical, the profile may be configured to honor the verbosity level regardless of the verbosity level included in the action.

According to another embodiment of the invention, the profile is configured to modify or ignore the priority attribute 226 included with the action according to one embodiment of the invention. The priority attribute 226 defines how quickly a debug session corresponding to the action should be started. For example, the priority attribute 226 may be marked as urgent (the debug session should begin immediately), high (the debug session should start as soon as possible), medium (the debug session should start soon), low (the debug session should start when possible), and deferrable (the debug session can start at a time the code module chooses). The profile may be configured to ignore the action if the priority attribute included within that action is medium, low, or deferrable according to one embodiment of the invention. Alternatively, the profile may be configured to ignore the priority attribute and start the debug session according to an attribute stored in the profile.

According to another embodiment of the invention, the profile is configured to modify or ignore the action based on the type of the action received. For example, if a code module handles routing, the profile for the code module may be configured to modify or ignore an action that is not related to routing. According to another embodiment of the invention, the profile is configured to modify or ignore the action based on the source attribute of the action. While certain embodiments of the invention have been described regarding the configuration of the profile, those of skill in the art will recognize that the profile configuration is not limited to the embodiments described. Thus the description of the profile is to be regarded as illustrative instead of limiting.

Thus, it should be understood that the system check and the code module check each adds dynamicity to debugging techniques by allowing the computing device to determine whether to generate debug messages based on system status, and by allowing individual code modules to determine whether to generate debug messages based on their status or preference. As generating debug messages is overhead and can affect the performance of a system, adding dynamicity allows debug messages to be generated automatically while ensuring that the system and the specific code module are capable of supporting the additional overhead caused by generating debug messages during the debug session.

Once the code module check 140A has been processed, set flag(s) 150A, and set flag(s) 150B are performed respectively. Set Flag(s) 150(A) and (B) set the flags as indicated in the flag attribute 232 in the received action. For example, referring to FIG. 2B, the action ID 1 indicates that flag 15 should be set. The action ID 2 indicates that flags 10 and 37 should be set. According to one embodiment of the invention the flags are set in a debug library 145 with the use of debug library functions 118. For example, at a time 5A the flags in debug library 145 are set according to the action(s) received by code module A, and at a time 6B the flags in debug library 145 are set according to the action(s) received by code module B. Setting debug flag(s) allows debug messages to be generated (e.g., once a debug flag is set the code corresponding to that debug flag is capable of generating debug messages). Thus, upon setting the debug flag the debug session can be considered to be started. Note that setting debug flags is a prior art technique that also occurs when a system administrator manually starts a debug session. Therefore, a debug session has begun for code module A corresponding to the action received by code module A, and a different debug session has begun for code module B corresponding to the action received by code module B.

Thus, a debug session has been automatically started (i.e., without user action) based on one or more events constituting an automatic start debug session condition at a first code module. In addition, that first code module has triggered a debug session to automatically start (i.e., without user action) at a second code module according to debug session properties that are also automatically sent to that second code module. Additionally, the system checks and code module checks ensure that the computing device and the specific code module are capable of supporting the additional overhead caused by generating debug messages during the debug session. Thus, debug sessions are automatically started in a dynamic yet controlled manner within a computing device. Therefore, relevant debug sessions are automatically started and pertinent debug messages are generated relative to an automatically detected automatic start debug session condition thus providing a user (e.g., system administrator) with focused debug messages from various code modules with the intent to guide the user to the problem causing the automatic start debug session condition. Thus, a problem that is rarely encountered (e.g., not expected and a solution is unknown) may be evidenced in a debug message generated by one or more code modules during one or more debug sessions that were automatically started and a user (e.g., system administrator) may use that debug message in an attempt to locate the problem and determine the solution.

Automatically starting debug sessions on multiple code modules, as opposed to manually starting debug sessions on each code module, decreases the intelligence required to perform debugging. For example, in the case of troubleshooting a problem, previously a system administrator must manually start a debug session and manually define the debug session at each code module in which the system administrator believes is relevant to the problem. In contrast, automatically starting debug sessions based on a detected automatic start debug session condition at one or more code modules according to the action(s) for the detected automatic start debug session condition allows debug messages to be generated across multiple code modules automatically as a result of that detected automatic start debug session condition. Thus, a computing device configured to automatically start debug sessions includes the intelligence to automatically start one or more debug sessions on one or more modules throughout the computing device.

Furthermore, automatically starting debug sessions allows debug messages to be generated substantially soon after a problem has occurred (e.g., after an automatic start debug session condition has been detected). In contrast, previously a system administrator must first determine that there is a problem before the system administrator can manually start any debug sessions. Thus, a system administrator previously had to realize that there is a problem in the computing device before manually starting a debug session. Automatically starting debug sessions at various code modules based on a detected automatic start debug session condition may provide early indication of malicious activities (e.g., denial of service attacks) as debug messages may be generated soon after the malicious activity has begun. Furthermore, in the case of a rare problem (i.e., a problem infrequently encountered), a system administrator may not ever know that a problem is occurring (or has occurred) if debug messages related to that problem are not generated. Thus, a computing device configured to automatically start debug sessions may automatically generate debug messages relevant to that rare problem allowing the system administrator to identify and resolve that rare problem.

Once the debug session has started, it is important to be able to control and appropriately stop the debug session. The debug message generation code block(s) with optional automatic stop 109A and 109B generates debug messages during the debug session. Check Flag(s) 160A and Check Flag(s) 160B check flags in the debug library at a time 6A and 7B respectively according to the actions respectively received. Thus, as the debug message generation code block(s) with optional automatic stop 109A and 109B are interspersed in the code for code module A and code module B, when encountering these points in the code the debug library 145 is checked to determine whether the code associated with the debug flag should be executed (and thus generate a debug message). Additionally, the debug messages may be filtered with use of a filter attribute 228 included in the action according to one embodiment of the invention. For example, referring to FIG. 2B, action ID 1 includes a filter for an IP address, namely 1.2.3.4. Thus, debug messages are generated only for the IP address 1.2.3.4. While in one embodiment of the invention the filter attribute is an IP address, in alternative embodiments of the invention different filters may be used (e.g., MAC address, circuit identifier, subscriber session identifier, network access identifier, etc.).

Also within debug message generation code block(s) with optional automatic stop 109A and 109B is check logging 170A and check logging 170B respectively. Check logging 170A and 170B are performed to determine whether each debug message should be logged. According to one embodiment of the invention each action received includes a log attribute 224 that indicates whether logging of the debug messages is enabled. Check logging 170A and check logging 170B use the action attributes storage 190A and 190B respectively to determine whether to log the debug message. If logging is enabled for the action received at code module A, at a time 7A check logging 170A sends the debug message to logging module 155. Similarly, if logging is enabled for the action received at code module B, at a time 8B check logging 170B sends the debug message to logging module 155. According to one embodiment of the invention logging module 155 further sends the debug messages to an external computing device by using any known means of propagating messages to an external computing device (e.g., syslog). According to another embodiment of the invention, logging module 155 sends the debug messages to an internal memory for local storage.

Also within debug message generation code block(s) with optional automatic stop 109A and 109B is check for automatic stop criterion 180A and 180B respectively. According to one embodiment of the invention, one or more stop criterions are included as attributes in the actions received. For example, referring to FIG. 2B, event attribute 214 indicates one or more events which when detected automatically stop the debug session, duration attribute 216 indicates the time in which to automatically stop the debug session, interrupt attribute 218 indicates whether the debug session can be interrupted by a user, and counter attribute 220 indicates how many debug messages are generated before the debug session is automatically stopped. According to another embodiment of the invention, a code module may transmit an explicit stop criterion to another code module that currently is operating a debug session. For example, referring to FIG. 1, code module A has triggered a debug session to be started on code module B. Code module A may send code module B an explicit stop criterion upon determining that the debug session is no longer needed.

In another embodiment of the invention, one or more stop criterions are included within a local profile of each code module. The one or more stop criterions included within the local code module profile may override or modify the one or more stop criterions included in the actions received. That is, the local code module profile may be configured to accept the one or more stop criterions included with the action, partially accept the one or more stop criterions included with the action, or reject the one or more stop criterions included with the action. For example, the duration attribute 216 in the actions received may be greater than or less than the duration as defined in the local code module profile. The local profile may be configured to accept the duration attribute defined in the action or it may reject the duration attribute.

Regardless of which stop criterion is detected, once the stop criterion is received and accepted by a code module, the flags in the library are reset and the debug messages cease to be generated. For example, referring to action ID 1, upon detecting one of the stop criterions (e.g., 300 seconds have passed since start of the debug session) the flag 15 is reset in the debug library 145. As another example, referring to action ID 2, upon detecting one of the stop criterions (e.g., 4 consecutive registration successes) the flags 37 and 10 are reset in the debug library 145. Thus, if a stop criterion is received and accepted by the code module, the debug flag(s) are reset and the debug session is automatically stopped.

Thus, in one embodiment of the invention, in addition to automatically starting the debug session (i.e., without user action), the debug session is automatically stopped based on one or more stop criterions without user action. As debug sessions are overhead both in the computing device and the particular code module in which the debug session is running, automatically stopping the debug session conserves resources (e.g., processing load, memory load, disk load, etc.). Furthermore, in addition to automatically starting one or more debug sessions based on a certain automatic start debug session condition, the number of debug messages generated is limited which provides a user (e.g., a system administrator) the ability to manage the debug messages and use the knowledge obtained from the debug messages efficiently.

According to one embodiment of the invention, the computing device 100 is a network element. A network element is an electronic device that provides support or services of a computer network. For example, a network element may be an intermediate device in the network (e.g., router, bridge, switch, etc.). In addition, the code modules within a network element that are capable of automatically starting debug sessions include a AAA module, a mobile IP module, a routing information base module, an internet services manager module, tunneling modules, application protocol modules (e.g., HTTP, DNS, FTP), network management module, statistics module, configuration and provisioning module, etc. Automatic start debug sessions conditions defined within a network element may include excessive authentication failures, excessive malformed packets, excessive packet drops, excessive routing update misses, excessive memory allocation failure, excessive protocol timeouts, excessive packet retransmissions, etc.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A computer implemented method for automatically triggering one or more debug sessions, comprising:
    determining, at a first code module in a computing device, a detected event constitutes an automatic start debug session condition, wherein the detected event is an occurrence of significance to the first code module, and wherein the automatic start debug session condition is a set of one or more start criterions of which the detected event is a part;
    determining one or more actions for that automatic start debug session condition, wherein each action includes properties of a different one of the one or more debug sessions and at least one of the one or more actions includes at least one stop criterion to automatically stop that corresponding debug session;
    sending at least one of the one or more actions to a second code module in the computing device upon automatically determining that the second code module should automatically start at least one debug session;
    setting one or more flags according to each action to start the debug session corresponding to each action;

generating a set of one or more debug messages corresponding to the flags that are set; and for each action including the at least one stop criterion:
    determining to automatically stop the debug session that corresponds to that action according to the stop criterion, and
    resetting the flags that correspond to that action.

2. The computer implemented method of claim 1 further comprising logging the one or more debug messages upon determining that the action indicates that logging is enabled.

3. The computer implemented method of claim 1 further comprising performing a system check that results in determining the computing device allows each of the one or more debug sessions to be started.

4. The computer implemented method of claim 1 further comprising performing a code module check that results in determining the code modules allow the one or more debug sessions to be started, wherein the code module check is based on a configured profile of the code modules.

5. The computer implemented method of claim 1, wherein the sending further includes the first code module transmitting the stop criterion to the second code module.

6. The computer implemented method of claim 1, wherein the stop criterion for at least one of the actions includes one or more events whose detection indicates the corresponding debug session should be automatically stopped.

7. A computing device configured to automatically control debugging, comprising:
  a processor; and
  a memory storing a debug library and one or more code modules, each code module including,
    one or more automatic start debug session detection code blocks each of which is configured to, when executed by the processor,
      cause a determination that a detected event constitutes an automatic start debug session condition, wherein the detected event is an occurrence of significance to the code module, and wherein the automatic start debug session condition is a set of one or more start criterions of which the detected event is a part, and
      cause a determination of one or more actions for that automatic start debug session condition, wherein each action defines properties of a debug session and at least one of the one or more actions includes at least one stop criterion to automatically stop the debug session,
    an automatic start debug session code block that is configured to, when executed by the processor,
      send at least one of the one or more actions to a different code module upon automatically determining that the different code module should automatically start at least one debug session, and
      set one or more flags in the debug library according to each action to start the debug session corresponding to each action,
    one or more debug message generation code blocks, each debug message generation code block is configured to, when executed by the processor,
      check the flags in the debug library for each action to determine whether to generate a set of one or more debug messages,
      generate the set of debug messages corresponding to the flags that are set, and
      for each of the actions including at least one stop criterion, to automatically stop the debug session that corresponds to the action according to the stop criterion, wherein stopping that debug session includes resetting the one or more flag in the debug library that correspond to that action.

8. The computing device of claim 7 wherein the one or more debug message generation code blocks further to determine whether each action indicates that the set of debug messages are to be logged, and wherein if the set of debug messages are to be logged then to transmit the set of debug messages to a logging module.

9. The computing device of claim 7 wherein the one or more automatic start debug session detection code blocks each of which further to cause a system check to be performed, wherein the system check determines whether the computing device allows each of the debug sessions to be started.

10. The computing device of claim 7 wherein the automatic start debug session code block further to perform a code module check to determine whether the code modules allow each of the debug sessions to be started, wherein the code module check is based on a configured profile of the code module.

11. The computing device of claim 7 further comprising:
  an auto debug library including,
    an automatic start debug session condition structure to define the automatic start debug session conditions and the one or more actions corresponding to those automatic start debug session conditions.

12. The computing device of claim 7 wherein the stop criterion is transmitted from one code module to another code module.

13. The computing device of claim 7 wherein the stop criterion includes one or more events whose detection indicates the corresponding debug session should be automatically stopped.

14. The computing device of claim 7 wherein each coder module further comprises an Inter-Process Communication (IPC) handler to send the one or more actions, and to receive sent actions.

15. A non-transitory tangible machine-readable medium that provides instructions that, if executed by a processor, will cause said processor to perform operations for automatically triggering one or more debug sessions, comprising:
  determining, at a first code module in a computing device, a detected event constitutes an automatic start debug session condition, wherein the detected event is an occurrence of significance to the first code module, and wherein the automatic start debug session condition is a set of one or more start criterions of which the detected event is a part;
  determining one or more actions for that automatic start debug session condition, wherein each action includes properties of a different one of the one or more debug sessions and at least one of the one or more actions includes at least one stop criterion to automatically stop that corresponding debug session;
  sending at least one of the one or more actions to a second code module in the computing device upon automatically determining that the second code module should automatically start at least one debug session;
  setting one or more flags according to each action to start the debug session corresponding to each action;
  generating a set of one or more debug messages corresponding to the flags that are set; and
  for each action including the at least one stop criterion:
    determining to automatically stop the debug session that corresponds to that action according to the stop criterion, and
    resetting the flags that correspond to that action.

16. The non-transitory tangible machine-readable medium of claim 15 further comprising logging the one or more debug messages upon determining that the action indicates that logging is enabled.

17. The non-transitory tangible machine-readable medium of claim 15 further comprising performing a system check that results in determining the computing device allows each of the one or more debug sessions to be started.

18. The non-transitory tangible machine-readable medium of claim 15 further comprising performing a code module check that results in determining the code modules allow the one or more debug sessions to be started, wherein the code module check is based on a configured profile of the code modules.

19. The non-transitory tangible machine-readable medium of claim 15 wherein the sending further includes the first code module transmitting the stop criterion to the second code module.

20. The non-transitory tangible machine-readable medium of claim 15 wherein the stop criterion for at least one of the actions includes one or more events whose detection indicates the corresponding debug session should be automatically stopped.

* * * * *

UNITED STATES PATENT AND TRADEMARK OFFICE
CERTIFICATE OF CORRECTION

PATENT NO. : 8,191,074 B2  
APPLICATION NO. : 11/985602  
DATED : May 29, 2012  
INVENTOR(S) : Rahman et al.

Page 1 of 1

It is certified that error appears in the above-identified patent and that said Letters Patent is hereby corrected as shown below:

In Column 16, Line 35, in Claim 14, delete "coder" and insert -- code --, therefor.

Signed and Sealed this  
Eleventh Day of September, 2012

David J. Kappos  
*Director of the United States Patent and Trademark Office*